United States Patent
Takeda et al.

(10) Patent No.: US 11,072,861 B2
(45) Date of Patent: Jul. 27, 2021

(54) GRAIN-ORIENTED ELECTRICAL STEEL SHEET AND METHOD FOR PRODUCING GRAIN-ORIENTED ELECTRICAL STEEL SHEET

(71) Applicant: NIPPON STEEL & SUMITOMO METAL CORPORATION, Tokyo (JP)

(72) Inventors: Kazutoshi Takeda, Himeji (JP); Fumikazu Andou, Himeji (JP); Tomoya Suenaga, Himeji (JP); Shuichi Yamazaki, Kimitsu (JP); Masaru Takahashi, Nishinomiya (JP)

(73) Assignee: NIPPON STEEL CORPORATION, Tokyo (JP)

(*) Notice: Subject to any disclaimer, the term of this patent is extended or adjusted under 35 U.S.C. 154(b) by 515 days.

(21) Appl. No.: 15/758,829

(22) PCT Filed: Sep. 28, 2016

(86) PCT No.: PCT/JP2016/078721
§ 371 (c)(1),
(2) Date: Mar. 9, 2018

(87) PCT Pub. No.: WO2017/057513
PCT Pub. Date: Apr. 6, 2017

(65) Prior Publication Data
US 2019/0186018 A1  Jun. 20, 2019

(30) Foreign Application Priority Data

Sep. 29, 2015 (JP) .............................. JP2015-191155

(51) Int. Cl.
*C23C 22/07* (2006.01)
*C22C 38/02* (2006.01)
(Continued)

(52) U.S. Cl.
CPC ............ *C23C 22/07* (2013.01); *C04B 28/344* (2013.01); *C21D 8/1283* (2013.01); *C22C 38/00* (2013.01);
(Continued)

(58) Field of Classification Search
CPC ....... H01F 1/18; C21D 8/1283; C21D 8/1288; C23C 22/07–23
See application file for complete search history.

(56) References Cited

U.S. PATENT DOCUMENTS 5,643,370 A * 7/1997 Huppi .................. C21D 8/1255
148/111
2009/0208764 A1* 8/2009 Tanaka .................... C23C 22/62
428/472.2
(Continued)

FOREIGN PATENT DOCUMENTS

| JP | 53-28375 B | 8/1978 |
| JP | 57-9631 B2 | 2/1982 |

(Continued)

OTHER PUBLICATIONS

Machine translation of JP 2007/023329 A, obtained from J-Platpat service of the JPO, 2020 (Year: 2020).*

(Continued)

*Primary Examiner* — Z. Jim Yang
(74) *Attorney, Agent, or Firm* — Birch, Stewart, Kolasch & Birch, LLP

(57) ABSTRACT

A grain-oriented electrical steel sheet according to one embodiment of the present invention includes a steel sheet and an insulation coating, in which the insulation coating contains a first metal phosphate, which is a metal phosphate of one or two more metals selected from Al, Fe, Mg, Mn, Ni, and Zn; a second metal phosphate, which is a metal phosphate of one or two more metals selected from Co, Mo, V, (Continued)

W, and Zr; and colloidal silica, the insulation coating does not contain chromate, and an elution amount of phosphoric acid of the insulation coating as determined by boiling the grain-oriented electrical steel sheet in a boiled pure water for 10 minutes, then measuring an elution amount of phosphoric acid into the pure water, and dividing the amount of phosphoric acid by the area of the insulation coating of the boiled grain-oriented electrical steel sheet is 30 mg/m$^2$ or less.

9 Claims, 1 Drawing Sheet

(51) Int. Cl.

| | |
|---|---|
| C22C 38/06 | (2006.01) |
| H01F 1/18 | (2006.01) |
| C22C 38/00 | (2006.01) |
| C23C 22/18 | (2006.01) |
| C23C 22/10 | (2006.01) |
| C23C 22/23 | (2006.01) |
| C21D 8/12 | (2006.01) |
| C23C 22/74 | (2006.01) |
| C23C 22/13 | (2006.01) |
| C23C 22/42 | (2006.01) |
| C04B 28/34 | (2006.01) |
| C23C 22/20 | (2006.01) |
| C23C 22/22 | (2006.01) |
| C22C 38/04 | (2006.01) |
| C23C 22/82 | (2006.01) |
| C04B 111/10 | (2006.01) |
| C04B 111/00 | (2006.01) |

(52) U.S. Cl.
CPC .......... *C22C 38/001* (2013.01); *C22C 38/002* (2013.01); *C22C 38/02* (2013.01); *C22C 38/04* (2013.01); *C22C 38/06* (2013.01); *C23C 22/10* (2013.01); *C23C 22/13* (2013.01); *C23C 22/18* (2013.01); *C23C 22/20* (2013.01); *C23C 22/22* (2013.01); *C23C 22/23* (2013.01); *C23C 22/42* (2013.01); *C23C 22/74* (2013.01); *C23C 22/82* (2013.01); *H01F 1/18* (2013.01); *C04B 2111/00525* (2013.01); *C04B 2111/1075* (2013.01); *C22C 2202/02* (2013.01)

(56) References Cited

U.S. PATENT DOCUMENTS

| | | | | |
|---|---|---|---|---|
| 2009/0233114 A1* | 9/2009 | Takeda | ................ | C21D 8/1288 428/472.3 |
| 2011/0067786 A1 | 3/2011 | Takashima et al. | | |
| 2012/0211123 A1* | 8/2012 | Honda | ..................... | C23C 2/40 148/243 |
| 2014/0377573 A1* | 12/2014 | Okubo | ................... | C22C 38/60 428/450 |
| 2015/0132547 A1* | 5/2015 | Inoue | ...................... | C21D 8/12 428/201 |
| 2016/0012949 A1* | 1/2016 | Uesaka | ................... | C22C 38/06 148/111 |
| 2016/0111182 A1* | 4/2016 | Sashi | ...................... | H01B 1/24 428/340 |
| 2016/0305026 A1* | 10/2016 | Terashima | .............. | C23C 22/78 |
| 2017/0137633 A1* | 5/2017 | Terashima | .............. | C23C 22/08 |
| 2017/0361571 A1* | 12/2017 | Ishizuka | ................ | B60K 15/03 |
| 2018/0080127 A1* | 3/2018 | Terashima | .............. | C23C 22/12 |
| 2018/0112313 A1* | 4/2018 | Dahlenburg | ......... | C23C 22/365 |
| 2018/0251899 A1* | 9/2018 | Terashima | .............. | C23C 22/18 |
| 2018/0374600 A1* | 12/2018 | Kwon | ...................... | H01B 3/10 |

FOREIGN PATENT DOCUMENTS

| | | | | |
|---|---|---|---|---|
| JP | 61-41778 A | 2/1986 | | |
| JP | 7-278828 A | 10/1995 | | |
| JP | 11-71683 A | 3/1999 | | |
| JP | 2000-178760 A | 6/2000 | | |
| JP | 2004-60026 A | 2/2004 | | |
| JP | 2005-187924 A | 7/2005 | | |
| JP | 2006169568 A * | 6/2006 | ............. | C23C 22/08 |
| JP | 2007023329 A * | 2/2007 | ............. | C23C 22/08 |
| JP | 2007-217758 A | 8/2007 | | |
| JP | 2008240080 A * | 10/2008 | ............. | C23C 22/74 |
| JP | 2008266743 A * | 11/2008 | ............. | C23C 22/74 |
| JP | 2009-13467 A | 1/2009 | | |
| JP | 2010-13692 A | 1/2010 | | |
| JP | 2012-92409 A | 5/2012 | | |
| JP | 2012-158800 A | 8/2012 | | |
| JP | 2013-249486 A | 12/2013 | | |
| RU | 2407818 C2 | 12/2010 | | |
| RU | 2431697 C1 | 10/2011 | | |
| WO | WO-2014188679 A1 * | 11/2014 | ......... | C23C 18/1241 |
| WO | WO 2015/115036 A1 | 8/2015 | | |
| WO | WO 2015/162837 A1 | 10/2015 | | |

OTHER PUBLICATIONS

Machine translation of JP 2007/217758 A, obtained from EspaceNet (Year: 2021).*
Russian Office Action and Search Report dated Jan. 11, 2019, for counterpart Russian Application No. 2018110597, with English translation.
Extended European Search Report, dated Mar. 6, 2019, for corresponding European Application No. 16851684.7.
Japanese Opposition, dated Feb. 13, 2020, for corresponding Japanese Application No. 2017-543521 (U.S. Pat. No. 6,547,835), with a partial English translation.
International Search Report for PCT/JP2016/078721 dated Nov. 1, 2016.
Written Opinion of the International Searching Authority for PCT/JP2016/078721 (PCT/ISA/237) dated Nov. 1, 2016.

* cited by examiner

GRAIN-ORIENTED ELECTRICAL STEEL SHEET AND METHOD FOR PRODUCING GRAIN-ORIENTED ELECTRICAL STEEL SHEET

TECHNICAL FIELD OF THE INVENTION

The present invention relates to a grain-oriented electrical steel sheet having an insulation coating not containing chromate, and a method for producing the grain-oriented electrical steel sheet.

Priority is claimed on Japanese Patent Application No. 2015-191155, filed on Sep. 29, 2015, the content of which is incorporated herein by reference.

RELATED ART

A grain-oriented electrical steel sheet is a steel sheet which is mainly used as an iron core of a transformer or the like. Typically, in such a grain-oriented electrical steel sheet, two surface coatings of a forsterite layer (also referred to as a primary coating) which is formed during final annealing at a high temperature, and a phosphate coating which is formed by baking at the time of heat flattening of the steel sheet after applying a treatment solution having phosphate and the like as main components are formed.

A phosphate coating is required to reduce an eddy current loss and improve an iron loss by imparting electrical insulation properties to a grain-oriented electrical steel sheet. In addition, it is required for a phosphate coating to have various properties such as corrosion resistance, heat resisting properties, slidability, and adhesion, in addition to insulation properties. This is because in a case in which a grain-oriented electrical steel sheet is worked into an iron core of a transformer or the like, various production steps are smoothly performed. For example, in a case in which the heat resisting properties, slidability, and adhesion of a phosphate coating are deteriorated, the phosphate coating is peeled off at the time of annealing for removing strain in the iron core production and thus the original insulation properties of the phosphate coating may not be exhibited or the phosphate coating may not be smoothly laminated to cause deterioration in workability.

Further, as important properties of the insulation coating of the grain-oriented electrical steel sheet, tension may be imparted to the steel sheet. In a case in which tension is imparted to the steel sheet, the iron loss of the grain-oriented electrical steel sheet can be improved by facilitating the movement of a magnetic domain wall. It is possible to reduce magnetic strain which is one main cause for noise generated by a transformer produced by using the grain-oriented electrical steel sheet as an iron core by imparting tension to the steel sheet.

In order to improve the above-described properties of the grain-oriented electrical steel sheet, specifically, the techniques disclosed in Patent Documents 1 to 7 below have been researched and developed.

For example, Patent Document 1 discloses a technique of baking after applying an insulation coating treatment solution having phosphate, chromate, and colloidal silica as main components at a specific composition to a forsterite coating formed on the surface of a steel sheet after final annealing. According to the technique disclosed in Patent Document 1, it is possible to reduce an iron loss and magnetic strain in the grain-oriented electrical steel sheet by forming an insulation coating having high tension on the surface of the steel sheet.

In addition, Patent Document 2 discloses a method for baking after applying a treatment solution containing an ultra fine grain colloidal silica having a grain size of 8 μm or less, primary phosphate, and chromate at a specific ratio to a steel sheet. According to the technique disclosed in Patent Document 2, it is possible to retain high tension in the insulation coating and further to improve the lubricity of the coating.

Further, Patent Document 3 discloses a technique of forming a high tension insulation coating on a surface of a grain-oriented electrical steel sheet by attaching a predetermined amount of an insulation coating having phosphate, chromate, and colloidal silica having a glass transition temperature of 950° C. to 1200° C. as main components to the steel sheet.

According to the techniques disclosed in Patent Documents 1 to 3 above, it is possible to form an insulation coating having remarkably excellent various coating properties and improved coating tension. However, in all of the techniques disclosed in Patent Documents 1 to 3, the insulation coating contains a chromate which is a chromium compound. In recent years, there has been a social request for inhibiting or limiting the use of compounds of lead, chromium, cadmium, and the like with the emergence of environmental problems.

Therefore, a technique capable of forming a good insulation coating without containing the chromium compound has been researched. For example, Patent Document 4 discloses a method for treating an insulation coating of a grain-oriented electrical steel sheet by baking a treatment solution containing 20 parts by mass of colloidal silica in terms of $SiO_2$ content, 10 to 120 parts by mass of aluminum phosphate, 2 to 10 parts by mass of boric acid, and total 4 to 40 parts by mass of a sulfate of one or more of metal elements selected from Mg, Al, Fe, Co, Ni and Zn at 300° C. or higher.

Patent Document 5 discloses a technique regarding a coating agent for coating forming including a mixture of boric acid and alumina sol and an organic solvent having compatibility with respect to water, and having a tension imparting effect on a grain-oriented electrical steel sheet.

Patent Document 6 discloses a technique of adding an organic acid salt of one or more metals selected from Ca, Mn, Fe, Zn, Co, Ni, Cu, B, and Al to a surface treatment agent for a grain-oriented electrical steel sheet containing phosphate and colloidal silica. In addition, in Patent Document 6, as the organic acid salt, formate, acetate, oxalate, tartrate, lactate, citrate, succinate and salicylate are exemplary examples.

Further, Patent Document 7 discloses a technique of, in an insulation coating treatment agent for a grain-oriented electrical steel sheet containing phosphate and colloidal silica, combining a metal component in the phosphate with a divalent metal element, a trivalent metal element, and a tetravalent or higher metal element at a specific ratio.

However, in the insulation coating disclosed in Patent Document 4, the corrosion resistance of the steel sheet is reduced due to sulfuric acid ions in the sulfate. In addition, in the technique disclosed in Patent Document 5, since the corrosion resistance and the baking temperature of the insulation coating are too high, the steel sheet is easily defected. In addition, in the technique disclosed in Patent Document 6, the color of the solution of the surface treatment agent is changed due to organic acid in the organic acid salt and thus solution stability is reduced. Further, in the technique disclosed in Patent Document 7, since the preparation of the coating solution is complicated and the concentration of the coating solution cannot be increased, it is difficult to achieve uniform coating.

In addition, the insulation coatings not containing chromate disclosed in Patent Documents 4 to 7 cannot impart sufficient tension to the steel sheets and thus an iron loss in the grain-oriented electrical steel sheets cannot be sufficiently improved. Accordingly, the techniques regarding the insulation coatings of these grain-oriented electrical steel sheets require further improvement.

The insulation coating of the grain-oriented electrical steel sheet imparts tension to the steel sheet by using a difference between the thermal expansion coefficient of the steel sheet and the thermal expansion coefficient of the insulation coating. In a case in which the thermal expansion coefficient of the insulation coating is smaller than the thermal expansion coefficient of the steel sheet, since the amount of constriction of the steel sheet occurring at the time of baking the insulation coating is larger than the amount of constriction of the insulation coating, tensile stress is imparted to the steel sheet and compressive stress is imparted to the insulation coating. Accordingly, in the related art, in order to increase the tension of the insulation coating of the grain-oriented electrical steel sheet, attempts have been mainly made to reduce the thermal expansion coefficient of the insulation coating and to increase the adhesion of the insulation coating. However, as a result of intensive research of the insulation coating not containing chromate of the related art conducted by the present inventors, it has been found that the insulation coating having a porous structure causes a reduction in tension. In a case in which the insulation coating has a porous structure, it has been assumed that fine fractures are initiated from the porous as the origin at the time of baking the insulation coating and thus the insulation coating cannot impart sufficient tensile stress to the steel sheet.

However, sufficient research on a relationship between the density of an insulation coating of a grain-oriented electrical steel sheet and the tension imparted to the grain-oriented electrical steel sheet by the insulation coating, and a method for densifying an insulation coating not containing chromate of a grain-oriented electrical steel sheet have not been conducted in the related art.

PRIOR ART DOCUMENT

Patent Document

[Patent Document 1] Japanese Examined Patent Application, Second Publication No. S53-28375
[Patent Document 2] Japanese Unexamined Patent Application, First Publication No. S61-41778
[Patent Document 3] Japanese Unexamined Patent Application, First Publication No. H11-071683
[Patent Document 4] Japanese Examined Patent Application, Second Publication No. S57-9631
[Patent Document 5] Japanese Unexamined Patent Application, First Publication No. H7-278828
[Patent Document 6] Japanese Unexamined Patent Application, First Publication No. 2000-178760
[Patent Document 7] Japanese Unexamined Patent Application, First Publication No. 2010-13692

DISCLOSURE OF THE INVENTION

Problems to be Solved by the Invention

An insulation coating of a grain-oriented electrical steel sheet has to be able to impart high tension to the surface of a steel sheet. Therefore, it is required for the insulation coating of the grain-oriented electrical steel sheet to have a small thermal expansion coefficient, high adhesion, and high density. It is also required for the insulation coating of the grain-oriented electrical steel sheet to have good corrosion resistance and good productivity, to contain no chromate, and the like.

The present invention has been made in consideration of the above circumstances and an object of the present invention is to provide a grain-oriented electrical steel sheet having an insulation coating capable of imparting high tension to the surface of a steel sheet, having good adhesion and corrosion resistance, having good productivity, and not containing chromate, and having good magnetic properties, and a method for producing the grain-oriented electrical steel sheet.

Means for Solving the Problem

The gist of the present invention is as follows.

(1) According to an aspect of the present invention, there is provided a grain-oriented electrical steel sheet including: a steel sheet and an insulation coating, in which the insulation coating contains a first metal phosphate, which is a metal phosphate of one or two more metals selected from Al, Fe, Mg, Mn, Ni, and Zn; a second metal phosphate, which is a metal phosphate of one or two more metals selected from Co, Mo, V, W, and Zr; and colloidal silica, the insulation coating does not contain chromate, and an elution amount of phosphoric acid of the insulation coating as determined by boiling the grain-oriented electrical steel sheet in a boiled pure water for 10 minutes, then measuring an amount of phosphoric acid eluted into the pure water, and dividing the amount of phosphoric acid by the area of the insulation coating of the boiled grain-oriented electrical steel sheet is 30 mg/m$^2$ or less.

(2) In the grain-oriented electrical steel sheet according to (1), the first metal phosphate may be the metal phosphate of the one or more metals selected from Al, Mg, Ni, and Zn.

(3) In the grain-oriented electrical steel sheet according to (1) or (2), the second metal phosphate may be the metal phosphate of the one or more metals selected from V, W, and Zr.

(4) In the grain-oriented electrical steel sheet according to any one of (1) to (3), a second metal phosphate content may be 0.5 to 10.0 mass % with respect to a total mass of the insulation coating.

(5) In the grain-oriented electrical steel sheet according to any one of (1) to (4), a colloidal silica content may be 25 to 55 mass % in terms of solid content with respect to the total mass of the insulation coating.

(6) In the grain-oriented electrical steel sheet according to any one of (1) to (5), an average primary grain size of the colloidal silica may be 7 to 30 nm.

(7) In the grain-oriented electrical steel sheet according to any one of (1) to (6), a coating amount of the insulation coating may be 2.0 to 7.0 g/m$^2$.

(8) In the grain-oriented electrical steel sheet according to any one of (1) to (7), the insulation coating may include at least one selected from the group consisting of boric acid, sodium borate, titanium oxide, molybdenum oxide, a pigment, and barium titanate.

(9) In the grain-oriented electrical steel sheet according to any one of (1) to (8), the steel sheet may include, by unit mass %, C: 0.005% or less, Si: 2.5 to 7.0%, Mn: 0 to 1.0%, Al: 0 to 0.03%, N: 0.01% or less, P: 0.01% or less, S: 0.01% or less, and a remainder consisting of Fe and impurities, the average grain size of the steel sheet may be 1 to 10 mm, and an angle formed between a crystal orientation of (110)[001] and a rolling direction of the steel sheet may be 8° or less on average.

(10) According to another aspect of the present invention, there is provided a method for producing a grain-oriented electrical steel sheet including: applying an insulation coating treatment solution to a surface of a steel sheet; and baking the insulation coating treatment solution to form an insulation coating, in which the insulation coating treatment solution contains 100 parts by mass of a first metal phosphate, which is a metal phosphate of one or more metals selected from Al, Fe, Mg, Mn, Ni, and Zn, in terms of solid content; 3 to 20 parts by mass of a second metal phosphate, which is a metal phosphate of one or two more metals selected from Co, Mo, V, W, and Zr, in terms of solid content; 35 to 125 parts by mass of colloidal silica in terms of solid content; and 0.3 to 6.0 parts by mass of a polymerization assistant, a temperature rising rate in a temperature range of 100 to 800° C. is set to 30° C./second or higher, a baking soaking temperature is set to 800 to 1000° C., and a soaking retention time is set to 10 to 60 seconds in the baking.

(11) In the method for producing a grain-oriented electrical steel sheet according to (10), the first metal phosphate may be the metal phosphate of the one or more metals selected from Al, Mg, Ni, and Zn.

(12) In the method for producing a grain-oriented electrical steel sheet according to (10) or (11), the second metal phosphate may be the metal phosphate of the one or more metals selected from V, W, and Zr.

(13) In the method for producing a grain-oriented electrical steel sheet according to any one of (10) to (12), the polymerization assistant may be at least one selected from the group consisting of nitrous acid, sodium nitrite, potassium nitrite, nitric acid, sodium nitrate, potassium nitrate, chlorite, sodium chlorite, phosphonic acid, sodium phosphonate, triphosphoric acid, sodium triphosphate, polyphosphoric acid, and sodium polyphosphate.

(14) In the method for producing a grain-oriented electrical steel sheet according to any one of (10) to (13), an average primary grain size of the colloidal silica may be 7 to 30 nm.

(15) In the method for producing a grain-oriented electrical steel sheet according to any one of (10) to (14), the insulation coating treatment solution may further contain at least one selected from the group consisting of boric acid, sodium borate, titanium oxide, molybdenum oxide, a pigment, and barium titanate.

(16) In the method for producing a grain-oriented electrical steel sheet according to any one of (10) to (15), the steel sheet may include, by unit mass %, C: 0.005% or less, Si: 2.5 to 7.0%, Mn: 0 to 1.0%, Al: 0 to 0.03%, N: 0.01% or less, P: 0.01% or less, S: 0.01% or less, and a remainder consisting of Fe and impurities, an average grain size of the steel sheet may be 1 to 10 mm, and the angle formed between a crystal orientation of (110)[001] and the rolling direction of the steel sheet may be 8° or less on average.

Effects of the Invention

According to the present invention described above, an insulation coating capable of imparting high tension to the surface of the steel sheet and not containing chromate is provided since the thermal expansion coefficient is small, the adhesion is high, and further the density is high. Accordingly, in the present invention, a grain-oriented electrical steel sheet of which the magnetic properties are significantly improved without using chromate can be obtained. In addition, according to the present invention, it is possible to obtain a grain-oriented electrical steel sheet having good corrosion resistance, slidability, and productivity.

EMBODIMENTS OF THE INVENTION

Figure 1:
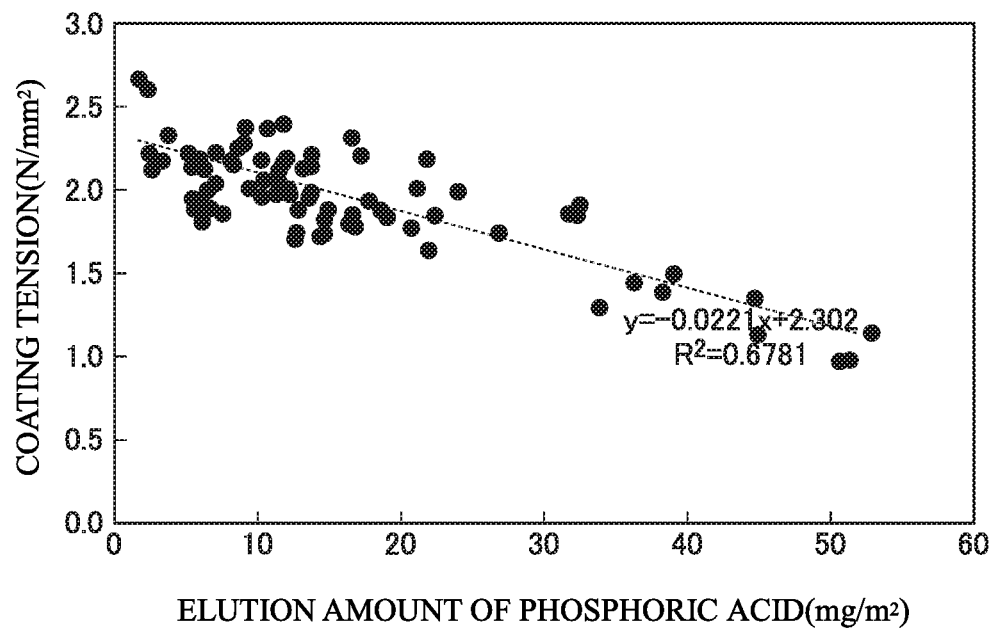
FIG. 1 is a graph in which the tension of an insulation coating is plotted with respect to an elution amount of phosphoric acid.

Hereinafter, suitable embodiments of the present invention will be described in detail with reference to the accompanying drawings.

In order for an insulation coating in a grain-oriented electrical steel sheet to impart tension to a steel sheet, a difference between the thermal expansion coefficient of the steel sheet and the thermal expansion coefficient of the insulation coating has to be made. Specifically, in a case in which the thermal expansion coefficient of the insulation coating is smaller than the thermal expansion coefficient of the steel sheet, the amount of constriction of the steel sheet occurring at the time of baking the insulation coating is larger than the amount of constriction of the insulation coating. Thus, tensile stress is imparted to the steel sheet and compressive stress is imparted to the insulation coating. Accordingly, in order to further increase the tensile stress imparted to the steel sheet, it is important to further reduce the thermal expansion coefficient of the insulation coating. In addition, in order not to peel off the insulation coating even in a case in which tension is imparted to the steel sheet, it is required for the insulation coating in the grain-oriented electrical steel sheet to have excellent adhesion.

As an insulation coating treatment agent for forming the insulation coating having properties described above, a mixture of phosphate, colloidal silica, and chromate is generally used. In this regard, there has been a social request for inhibiting or limiting the use of a chromium compound such as chromate with growing awareness of environmental problems in recent years. However, an insulation coating not including chromate cannot impart sufficient tension to the steel sheet and thus an iron loss of a grain-oriented electrical steel sheet cannot be sufficiently improved.

Therefore, the present inventors have conducted intensive research for obtaining an insulation coating having a chemical composition not containing chromate and retaining high tension required for a grain-oriented electrical steel sheet. As a result, the present inventors have found that the insulation coating, not containing chromate, having a porous structure causes a reduction in tension.

In the related art, it has been considered that in the insulation coating having phosphate and colloidal silica as main components, the colloidal silica causes a reduction in the thermal expansion coefficient of the insulation coating and the phosphate functions as a binder. However, it has been found that in the insulation coating containing phosphate and not containing chromate, the coating has a porous structure. In a case in which the insulation coating has a porous structure, it has been assumed that fine fractures are initiated from the porous as the origin and the insulation coating cannot impart sufficient tensile stress to the steel sheet. Here, as a result of intensive research on a method for densifying the insulation coating conducted by the researcher, it has been found that the bonding between the metal phosphates is increased and the porousness of the insulation coating is prevented by using a phosphate obtained by combining a first metal phosphate and a second metal phosphate, which will be described later, as the material for the insulation coating and further adding a polymerization assistant thereto so that a dense insulation coating can be formed. In a case in which the insulation coating is densified, it has been found that subsidiary effects of reducing the friction coefficient of the insulation coating and improving the slidability of a grain-oriented electrical steel sheet can be obtained.

However, it is very difficult to quantitatively measure the polymerization degree of phosphate and the density itself of the insulation coating. In the related art, the polymerization degree of phosphate and the density of the insulation coating have been qualitatively determined by observing the electron micrograph of the insulation coating. However, the present inventors have found that an insulation coating having a small elution amount of phosphoric acid is likely to have a high polymerization degree of phosphate and a high density. In the embodiment, the term "elution amount of phosphoric acid" is defined as a value by measured by boiling a grain-oriented electrical steel sheet having the insulation coating in boiled pure water for a predetermined period of time, measuring the amount of phosphoric acid eluted into the pure water by the boiling, and dividing the measured amount of phosphoric acid by the area of the insulation coating of the boiled grain-oriented electrical steel sheet. The area of the insulation coating of the grain-oriented electrical steel sheet is an area of the insulation coating as viewed from the surface of rolling of the grain-oriented electrical steel sheet, and in a case in which the insulation coating is formed on both surfaces of rolling of the grain-oriented electrical steel sheet, a value obtained adding areas of both surfaces of rolling of the insulation coating is used. The elution amount of phosphoric acid can be used as an index for quantitatively evaluating the polymerization degree of phosphate in the insulation coating and the density of the insulation coating. In a case in which the elution amount of phosphoric acid of the insulation coating is small, it is determined that the polymerization degree of phosphate in the insulation coating is high and the density of the insulation coating is high.

Further, the present inventors have found that regarding an insulation coating having phosphate and colloidal silica as main components, in which the phosphate is a combination of a metal phosphate of one or more metals having relatively high solubility selected from Al, Fe, Mg, Mn, Ni, and Zn (hereinafter, referred to as a first metal phosphate) and a metal phosphate of one or more metals having relatively low solubility selected from Co, Mo, V, W, and Zr (hereinafter, referred to as a second metal phosphate), there is a strong correlation between the elution amount of phosphoric acid of the insulation coating and tension imparted to the steel sheet.

FIG. 1 is a graph showing a relationship between the elution amount of phosphoric acid ($mg/m^2$) at the time of boiling in pure water for 10 minutes and the insulation coating tension ($N/mm^2$) calculated per 1 $g/m^2$ of the insulation coating in various steel sheets each having an insulation coating containing the first metal phosphate, the second metal phosphate, and colloidal silica and not containing chromate. The elution amount of phosphoric acid is measured according to the above-described definition. The coating tension of the insulation coating is measured by the warpage amount of the steel sheet caused by removing the insulation coating on one surface. In the preparation of various insulation coatings as samples, the polymerization degree is changed by changing the composition of the first and second metal phosphates and colloidal silica, and the amount of a polymerization assistant.

As shown in FIG. 1, in the insulation coating containing the first metal phosphate, the second metal phosphate, and colloidal silica and not containing chromate, a good linear relationship is observed between the elution amount of phosphoric acid ($mg/m^2$) and the insulation coating tension (N) calculated per 1 $g/m^2$ of the insulation coating. In order to improve an iron loss of the grain-oriented electrical steel sheet, the coating tension is desirably more than 1.5 N and thus it is determined the elution amount of phosphoric acid is required to limit to 30 $mg/m^2$ or less in consideration of the test results shown in FIG. 1. In the test shown in FIG. 1, almost all samples belong to either a group in which the elution amount of phosphoric acid is more than 0 $mg/m^2$ and less than 25 $mg/m^2$ or a group in which the elution amount of phosphoric acid is more than 30 $mg/m^2$ and samples having an elution amount of phosphoric acid of 25 to 30 $mg/m^2$ hardly exist. Although the cause is not clear, it is assumed that the structure of the insulation coating is changed with a range of an elution amount of phosphoric acid of 25 to 30 $mg/m^2$ as a threshold value.

Based on the above test results, the present inventors have found that in the insulation coating containing the first metal phosphate, the second metal phosphate, and colloidal silica and not containing chromate, an insulation coating having a dense structure can be formed on the surface of the steel sheet and high tension can be imparted to the steel sheet by limiting the elution amount of phosphoric acid to 30 $mg/m^2$ or less and suppressing the formation of free phosphoric acid.

In order to measure the elution amount of phosphoric acid, it is required that the grain-oriented electrical steel sheet having the insulation coating is boiled in boiled pure water for 10 minutes and then the amount of phosphoric acid eluted into the pure water by the boiling is measured as described above. For the measurement of the amount of phosphoric acid eluted into the pure water, various methods may be used. For example, inductively coupled plasma atomic emission spectrometry (ICP-AES), hydrazine sulfate emission spectrometry, and the like are known, but there is no particular limitation. For example, quantitative analysis by ICP-AES can be used.

Next, the reasons for limiting the grain-oriented electrical steel sheet according to the embodiment will be described.

The grain-oriented electrical steel sheet according to the embodiment has a steel sheet and an insulation coating. The insulation coating of the grain-oriented electrical steel sheet according to the embodiment contains a first metal phosphate, which is a metal phosphate of one or two more metals selected from Al, Fe, Mg, Mn, Ni, and Zn, a second metal phosphate, which is a metal phosphate of one or two more metals selected from Co, Mo, V, W, and Zr, and colloidal silica, does not contain chromate, and is formed on the surface of the steel sheet. Further, the elution amount of phosphoric acid of the insulation coating of the grain-oriented electrical steel sheet according to the embodiment, as measured according to the above-described method is 30 $mg/m^2$ or less.

In a case in which the elution amount of phosphoric acid is more than 30 $mg/m^2$, the coating tension is not sufficient. It is considered that this is because the density of the insulation coating is deteriorated. In addition, in a case in which the elution amount of phosphoric acid is excessive, the coating tension is reduced and the insulation coating absorbs moisture. Thus, there is a possibility of causing deterioration in corrosion resistance. For the above reasons, the elution amount of phosphoric acid of the insulation coating of the grain-oriented electrical steel sheet according to the embodiment is set to 30 mg/m² or less. The elution amount of phosphoric acid of the insulation coating is preferably 27 mg/m² or less, 20 mg/m² or less, or 12 mg/m² or less.

In a case in which the insulation coating has a porous structure, the surface area of the insulation coating is increased and phosphoric acid is also eluted from the inside of the coating. Thus, the elution amount of phosphoric acid is also increased as the coating amount of the insulation coating is increased. However, since the insulation coating in the grain-oriented electrical steel sheet according to the embodiment has a dense structure, phosphoric acid is eluted only from the surface of the insulation coating and the elution amount of phosphoric acid from the inside of the coating is negligibly small. Accordingly, in the grain-oriented electrical steel sheet according to the embodiment, the upper limit of the elution amount of phosphoric acid of the insulation coating is 30 mg/m² irrespective of the coating amount of the insulation coating.

The smaller the elution amount of phosphoric acid of the insulation coating is, the more preferable it is. Thus, the lower limit value is 0 mg/m². However, in consideration of production costs, the lower limit value of the elution amount of phosphoric acid of the insulation coating is, for example, 3 mg/m² or 8 mg/m².

The metal phosphate of the insulation coating of the grain-oriented electrical steel sheet according to the embodiment is a combination of a metal phosphate of one or more metals having relatively high solubility selected from Al, Fe, Mg, Mn, Ni, and Zn (hereinafter, referred to as a first metal phosphate) and a metal phosphate of one or more metals having relatively low solubility selected from Co, Mo, V, W, and Zr (hereinafter, referred to as a second metal phosphate). The present inventors have found that it is difficult to suppress the elution amount of phosphoric acid of the insulation coating only with the first metal phosphate having relatively high solubility. On the other hand, since the second metal phosphate having relatively low solubility cannot be dissolved in a treatment solution which is the material for the insulation coating at a high concentration, it is difficult to form an insulation coating having sufficient thickness, uniformity, density, and the like. By combining the first metal phosphate and the second metal phosphate, the elution amount of phosphoric acid of the insulation coating is suppressed so that the density of the insulation coating can be improved.

The first metal phosphate is preferably a metal phosphate of one or more metals selected from Al, Mg, Ni, and Zn. This is because in a case in which the first metal phosphate is a metal phosphate of one or more metals selected from Al, Mg, Ni, and Zn, flat and uniform external appearance can be obtained in a wide range of baking conditions. In addition, the second metal phosphate is preferably a metal phosphate of one or more metals selected from V, W, and Zr. This is because in a case in which the second metal phosphate is a metal phosphate of one or more metals selected from V, W, and Zr, a coating with uniform color tone can be obtained. In a case in which the second metal phosphate includes Co, the color tone of the coating is likely to be uneven and thus it is required to strictly control the coating drying conditions.

It is preferable that a metal phosphate of a metal such as Na, K, Ca, Sr, and Ba other than the above metals is not used in the insulation coating of the grain-oriented electrical steel sheet according to the embodiment. For example, an alkali metal salt, such as Na salt or K salt, of phosphoric acid causes a reduction in the corrosion resistance of the insulation coating and thus is not preferable. Since a Ca salt of phosphoric acid easily forms an apatite-based hydrous mineral and also causes a reduction in the corrosion resistance of the insulation coating, the Ca salt of phosphoric acid is not preferable. In addition, since a Sr salt, a Ba salt, and the like of phosphoric acid have a very low solubility, even in a case in which these salts are mixed with a metal phosphate having a relatively high solubility, the solution stability of the insulation coating treatment solution is poor and a uniform insulation coating cannot be formed. Thus, the use of these salts is not preferable.

The embodiment of the colloidal silica (silica particles) of the insulation coating of the grain-oriented electrical steel sheet according to the embodiment is not particularly limited, and the average grain size (average primary grain size) is preferably 7 to 30 nm. In a case in which the average grain size of the colloidal silica is less than 7 nm, the solution stability of the insulation coating treatment solution may be deteriorated and the insulation coating may become a porous coating having large voids to reduce the adhesion of the insulation coating. Thus, this case is not preferable. On the other hand, in a case in which the average grain size of the colloidal silica is more than 30 nm, the reactivity of the colloidal silica may not be sufficient, the phosphate, which is a binder, and the colloidal silica may not be sufficiently mixed, and cracks may be initiated in the insulation coating, thereby reducing adhesion. Thus, this case is not preferable. In addition, it is more preferable that the lower limit value of the average grain size of the colloidal silica is 8 nm or 10 nm. It is more preferable that the upper limit value of the average grain size of the colloidal silica is 25 nm, 20 nm, 15 nm, or 12 nm. Further, it is more preferable that the surface of the colloidal silica is chemically treated with aluminum. The average grain size (average primary grain size) of the colloidal silica can be obtained by, for example, conversion from a specific surface area measurement value (according to JIS Z8830) by a BET adsorption method.

In the insulation coating of the grain-oriented electrical steel sheet according to the embodiment, each ratio of the first metal phosphate, second metal phosphate, and colloidal silica is not particularly limited. As long as the elution amount of phosphoric acid is 30 mg/m² or less, the insulation coating of the grain-oriented electrical steel sheet according to the embodiment can exhibit excellent properties. However, preferable values are provided below.

The colloidal silica content of the insulation coating is preferably 25 to 55 mass % in terms of solid content with respect to the total mass of the insulation coating. In a case in which the colloidal silica content of the insulation coating is less than 25 mass %, the coating tension of the insulation coating may not be sufficient and thus this case is not preferable. In a case in which the colloidal silica content of the insulation coating is more than 55 mass %, the adhesion of the insulation coating may be reduced and thus this case is not preferable. In addition, the lower limit value of the colloidal silica content of the insulation coating is more preferably 27 mass %, 30 mass %, 32 mass %, or 35 mass % in terms of solid content with respect to the total mass of the insulation coating. The upper limit value of the colloidal silica content of the insulation coating is more preferably 50 mass %, 49 mass %, 45 mass %, or 40 mass % in terms of solid content with respect to the total mass of the insulation coating.

The second metal phosphate content of the insulation coating is preferably 0.5 to 10.0 mass % with respect to the total mass of the insulation coating. In a case in which the second metal phosphate content of the insulation coating is less than 0.5 mass %, the insulation coating may not be densified and the elution amount of phosphoric acid of the insulation coating may not be suppressed. In a case in which the second metal phosphate content of the insulation coating is more than 10.0 mass %, a uniform film formation may be difficult. This is because, in a case in which the amount of the second metal phosphate having a low solubility is excessive, the second metal phosphate may not be completely dissolved in the insulation coating treatment solution, which is the material for the insulation coating. A more preferable upper limit value of the second metal phosphate content of the insulation coating is 9.0 mass %, 7.0 mass %, or 4.0 mass %. A more preferable lower limit value of the second metal phosphate content of the insulation coating is 0.8 mass %, 1.0 mass %, or 1.5 mass %.

The remainder of the insulation coating of the grain-oriented electrical steel sheet according to the embodiment other than the above-described colloidal silica and second metal phosphate is mainly constituted of the first metal phosphate.

The insulation coating of the grain-oriented electrical steel sheet according to the embodiment may further include an inorganic compound such as boric acid, sodium borate, various oxides such as titanium oxide and molybdenum oxide, a pigment, or barium titanate. In addition, the insulation coating of the grain-oriented electrical steel sheet according to the embodiment may further include various compounds derived from a polymerization assistant, which will be described later, included in the insulation coating treatment solution, which is the material for the insulation coating. The amount of these compounds other than the first metal phosphate, the second metal phosphate, and the colloidal silica is not particularly limited since the amount of these compounds is maintained at a level not causing adverse effects on the properties of the insulation coating as long as the elution amount of phosphoric acid of the insulation coating is in a defined range. On the other hand, the upper limit value of the amount of these compounds in the insulation coating other than the first metal phosphate, the second metal phosphate, and the colloidal silica may be 10 mass %, 9 mass %, or 8 mass % with respect to the total mass of the insulation coating. The lower limit value of the amount of these compounds in the insulation coating other than the first metal phosphate, the second metal phosphate, and the colloidal silica may be 0 mass %.

The amount of the coating of the insulation coating of the grain-oriented electrical steel sheet according to the embodiment is not particularly limited but the amount of the coating is suitably 2.0 to 7.0 g/m$^2$. In a case in which the amount of the coating is less than 2.0 g/m$^2$, it is difficult to impart tension to the grain-oriented electrical steel sheet and the insulation properties and corrosion resistance of the grain-oriented electrical steel sheet or the like are reduced. Thus, this case is not preferable. On the other hand, in a case in which the amount of the coating is more than 7.0 g/m$^2$, the space factor of the grain-oriented electrical steel sheet is reduced and the properties of a transformer are deteriorated. Thus, this case is not preferable. The lower limit value of the amount of the coating of the insulation coating is more preferably 3.0 g/m$^2$ or 4.0 g/m$^2$. The upper limit value of the amount of the coating of the insulation coating is more preferably 6.0 g/m$^2$ or 5.0 g/m$^2$.

In the insulation coating of the grain-oriented electrical steel sheet according to the embodiment, the second metal phosphate content can be measured by the amount of a metal element obtained by an element analysis method such as ICP-AES. In the insulation coating of the grain-oriented electrical steel sheet according to the embodiment, the colloidal silica content can be also measured by measuring the amount of Si using ICP-AES. In the insulation coating of the grain-oriented electrical steel sheet according to the embodiment, the amount of substances other than the first metal phosphate, the second metal phosphate, and the colloidal silica (for example, boric acid, sodium borate, titanium oxide, molybdenum oxide, a pigment, and barium titanate) can be measured by an element analysis method such as ICP-AES or an atomic absorption spectroscopy. In the insulation coating of the grain-oriented electrical steel sheet according to the embodiment, the first metal phosphate content is obtained by subtracting the total amount of components other than the first metal phosphate from 100 mass %.

A method for measuring the elution amount of phosphoric acid of the grain-oriented electrical steel sheet according to the embodiment is as described above. The average primary grain size of the colloidal silica of the grain-oriented electrical steel sheet according to the embodiment can be measured with an electron microscope. The average primary grain size of colloidal silica that can be used as the material for the insulation coating is substantially the same as the average primary grain size of the colloidal silica of the insulation coating. The amount of the coating of the insulation coating of the grain-oriented electrical steel sheet according to the embodiment can be measured by measuring a difference in weight before and after peeling-off of the coating.

Figure 2:
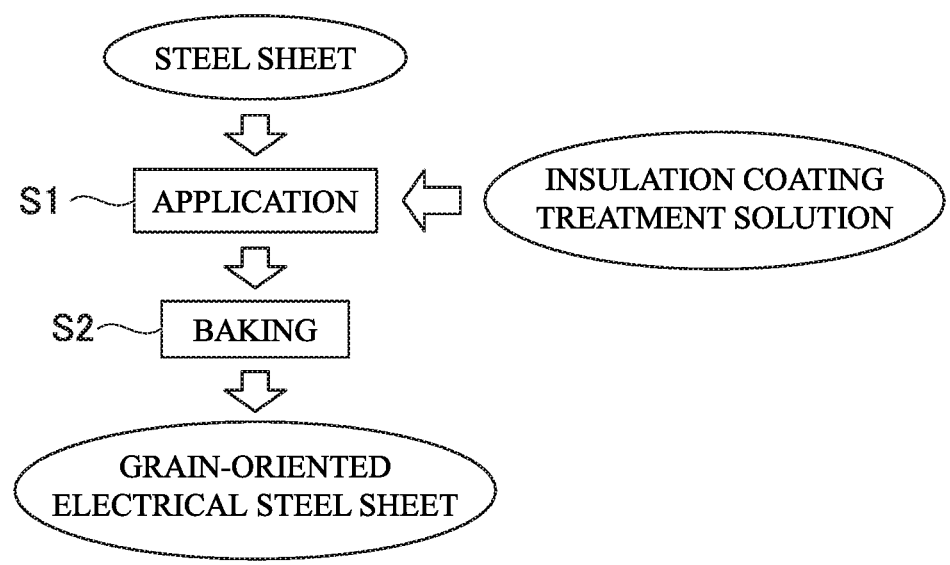
FIG. 2 is a flowchart showing a method for producing a grain-oriented electrical steel sheet according to an embodiment of the present invention.

Next, a method for producing a grain-oriented electrical steel sheet according to the embodiment will be described. As shown in FIG. 2, the method for producing a grain-oriented electrical steel sheet according to the embodiment (insulation coating treatment method) includes Step S1 of applying an insulation coating treatment solution to a surface of a steel sheet, and Step S2 of baking the insulation coating treatment solution. An insulation coating is formed by baking. The insulation coating treatment solution contains 100 parts by mass of a first metal phosphate in terms of solid content, 3 to 20 parts by mass of a second metal phosphate in terms of solid content, 35 to 125 parts by mass of colloidal silica in terms of solid content, and 0.3 to 6.0 parts by mass of a polymerization assistant. In the baking, a temperature rising rate in a temperature range of 100 to 800° C. is set to 30° C./second or higher, the baking soaking temperature is set to 800 to 1000° C., and the soaking retention time is set to 10 to 60 seconds.

First, in the method for producing a grain-oriented electrical steel sheet according to the embodiment, the insulation coating treatment solution will be described.

The insulation coating treatment solution contains a first metal phosphate, a second metal phosphate, colloidal silica, and a polymerization assistant. The first metal phosphate of the insulation coating treatment solution is a metal phosphate of one or more metals selected from Al, Fe, Mg, Mn, Ni, and Zn, and the second metal phosphate of the insulation coating treatment solution is a metal phosphate of one or more metals selected from Co, Mo, V, W, and Zr. In addition, the first metal phosphate of the insulation coating treatment solution is preferably a metal phosphate of one or more metals selected from Al, Mg, Ni, and Zn, and the second metal phosphate of the insulation coating treatment solution is preferably a metal phosphate of one or more metals selected from V, W, and Zr. The reasons for selecting these metal phosphates as the materials for the insulation coating treatment solution are the same as the reasons for selecting the metal phosphates in the insulation coating.

The formulated amount of the second metal phosphate in the insulation coating treatment solution in terms of solid content is suitably 3 to 20 parts by mass with respect to 100 parts by mass of the first metal phosphate in terms of solid content. In a case in which the formulated amount of the second metal phosphate in the insulation coating treatment solution in terms of solid content is less than 3 parts by mass with respect to 100 parts by mass of the first metal phosphate in terms of solid content, the insulation coating is densified and the elution amount of phosphoric acid of the insulation coating cannot be suppressed. On the other hand, in a case in which the formulated amount of the second metal phosphate in the insulation coating treatment solution in terms of solid content is more than 20 parts by mass with respect to 100 parts by mass of the first metal phosphate in terms of solid content, it is difficult to completely dissolve the second metal phosphate having a low solubility in the insulation coating treatment solution and the uniformity of the insulation coating is deteriorated. The lower limit value of the formulated amount of the second metal phosphate in the insulation coating treatment solution in terms of solid content is suitably 5 parts by mass or 7 parts by mass with respect to 100 parts by mass of the first metal phosphate in terms of solid content. In addition, the upper limit value of the formulated amount of the second metal phosphate in the insulation coating treatment solution in terms of solid content is suitably 15 parts by mass or 10 parts by mass with respect to 100 parts by mass of the first metal phosphate in terms of solid content.

The polymerization assistant contained in the insulation coating treatment solution is used for promoting a dehydration polymerization reaction of the metal phosphate. Examples of the polymerization assistant include nitrous acid, nitric acid, chloric acid, and salts thereof, and low molecular condensed phosphoric acid compounds such as condensed phosphoric acid and condensed phosphate, which function as dehydrating agents.

Specifically, the polymerization assistant may be at least one selected from the group consisting of nitrous acid, sodium nitrite, potassium nitrite, nitric acid, sodium nitrate, potassium nitrate, chlorite, sodium chlorite, phosphonic acid, sodium phosphonate, triphosphoric acid, sodium triphosphate, polyphosphoric acid, and sodium polyphosphate. These may be used alone or may be used in combination thereof. In addition, it is preferable to use at least one selected from the group consisting of particularly sodium nitrite, nitrous acid, and phosphonic acid as the polymerization assistant.

The formulated amount of the polymerization assistant in the insulation coating treatment solution is suitably 0.3 to 6.0 parts by mass with respect to 100 parts by mass of the first metal phosphate in terms of solid content. In a case in which the formulated amount of the polymerization assistant in the insulation coating treatment solution is less than 0.3 parts by mass with respect to 100 parts by mass of the first metal phosphate in terms of solid content, the polymerization reaction of the metal phosphate does not sufficiently proceed and it is difficult to obtain high tension in the insulation coating. On the other hand, in a case in which the formulated amount of the polymerization assistant in the insulation coating treatment solution is more than 6.0 parts by mass with respect to 100 parts by mass of the first metal phosphate in terms of solid content, the corrosion resistance of the insulation coating may be reduced. In the method for producing a grain-oriented electrical steel sheet according to the embodiment, by adding a predetermined amount of the polymerization assistant to the insulation coating treatment solution, the elution amount of phosphoric acid of the insulation coating is suppressed and the tension of the insulation coating is increased. The formulated amount of the polymerization assistant in the insulation coating treatment solution is preferably 0.8 to 2.0 parts by mass with respect to 100 parts by mass of the first metal phosphate in terms of solid content. The components of the polymerization assistant remain in the insulation coating after baking in some cases. However, as long as the kind and formulated amount of the polymerization assistant are in the above-described ranges, the remainder is allowable.

The formulated amount of the colloidal silica in the insulation coating treatment solution is suitably 35 to 125 parts by mass in terms of solid content with respect to 100 parts by mass of the first metal phosphate in terms of solid content. In a case in which the formulated amount of the colloidal silica in the insulation coating treatment solution is less than 35 parts by mass in terms of solid content with respect to 100 parts by mass of the first metal phosphate in terms of solid content, a tension imparting effect by the colloidal silica cannot be exhibited. On the other hand, in a case in which the formulated amount of the colloidal silica in the insulation coating treatment solution is more than 125 parts by mass in terms of solid content with respect to 100 parts by mass of the first metal phosphate in terms of solid content, the film forming properties of the formed insulation coating may be deteriorated and the adhesion may be reduced. The lower limit value of the formulated amount of the colloidal silica in terms of solid content is preferably 45 parts by mass or 50 parts by mass with respect to 100 parts by mass of the first metal phosphate in terms of solid content. The upper limit value of the formulated amount of the colloidal silica in the insulation coating treatment solution in terms of solid content is preferably 100 parts by mass or 75 parts by mass with respect to 100 parts by mass of the first metal phosphate in terms of solid content. In a case in which the formulated amount of the colloidal silica is in the above range, it is possible to obtain an insulation coating having better external appearance.

The aspect of the colloidal silica in the insulation coating treatment solution is not particularly limited but the average grain size (average primary grain size) is preferably 7 to 30 nm. The lower limit value of the average grain size of the colloidal silica is more preferably 8 nm or 10 nm. The upper limit value of the average grain size of the colloidal silica is more preferably 20 nm, 15 nm, or 12 nm. The reasons why these grain sizes are preferable is the same as the reasons for selecting the grain size of the colloidal silica in the insulation coating.

To the colloidal silica or to the insulation treatment solution used in the grain-oriented electrical steel sheet according to the embodiment, an inorganic compound such as boric acid, sodium borate, various oxides such as titanium oxide and molybdenum oxide, a pigment, or barium titanate may be added. Particularly, in a case of adding an inorganic compound such as a pigment, the insulation coating is colored, the coating hardness is increased, and thus the effect that the insulation coating is not easily defected is obtained. Thus, this case is preferable.

However, these substances other than the first metal phosphate, the second metal phosphate, the colloidal silica, and the polymerization assistant are not necessary in the method for producing the insulation coating of the grain-oriented electrical steel sheet according to the embodiment. Accordingly, the lower limit value of the formulated amount of these substances in the insulation coating treatment solution is 0 parts by mass with respect to 100 parts by mass of the first metal phosphate in terms of solid content. In addition, the upper limit value of the formulated amount of these substances other than the first metal phosphate, the second metal phosphate, the colloidal silica, and the polymerization assistant in the insulation coating treatment solution is not particularly defined. However, the upper limit value of these substances other than the first metal phosphate, the second metal phosphate, the colloidal silica, and the polymerization assistant in terms of solid content may be defined as 15 parts by mass, 12 parts by mass, or 10 parts by mass with respect to 100 parts by mass of the first metal phosphate in terms of solid content.

Since the insulation treatment solution in the method for producing a grain-oriented electrical steel sheet according to the embodiment is not required to include an organic acid salt, the solution stability is high and the color of the solution is not easily changed. Since the formulated amount of the second metal phosphate having a low solubility is limited to be in the defined range, the insulation treatment solution in the method for producing a grain-oriented electrical steel sheet according to the embodiment can be easily and uniformly applied to the steel sheet.

Next, the method for forming the insulation coating in the method for producing a grain-oriented electrical steel sheet according to the embodiment will be described.

The steel sheet on which the insulation coating is formed in the method for producing a grain-oriented electrical steel sheet according to the embodiment may be a grain-oriented electrical steel sheet having a typical forsterite coating or may be a grain-oriented electrical steel sheet not having a forsterite coating. In a case of using any of these steel sheets, the grain-oriented electrical steel sheet is subjected to pickling treatment using a sulfuric acid bath or the like and washed with water after an excessive annealing separating agent is removed by washing with water after final annealing. Thus, the surface of the steel sheet is washed and activated. Then, the insulation coating treatment solution is applied to the steel sheet. The grain-oriented electrical steel sheet to which the insulation coating treatment solution is applied is subjected to a baking step under the conditions described later and thus an insulation coating is formed on the surface thereof.

In the baking step, the grain-oriented electrical steel sheet to which the insulation coating treatment solution is applied is heated to a baking soaking temperature, retained at the baking soaking temperature, and then cooled. Here, in order to idealize the polymerization state of the metal phosphate, it is important to appropriately control the temperature rising rate (° C./second) in a temperature range of 100 to 800° C., the baking soaking temperature (° C.), and the soaking retention time (second) in the baking step of the applied insulation coating treatment solution.

The temperature rising rate (° C./second) in a temperature range of 100 to 800° C. is required to be 30° C./second or higher, is preferably 50° C./second or higher, and more preferably 70° C./second or higher. In a case in which the temperature rising rate is 50° C./second or higher, an insulation coating which imparts high tension is easily obtained and in a case in which the temperature rising rate is 70° C./second or higher, a uniform insulation coating is easily obtained, and thus these cases are preferable. On the other hand, in a case in which the temperature rising rate is lower than 30° C./second, the insulation coating becomes nonuniform and thus sufficient coating tension cannot be obtained. The upper limit value of the temperature rising rate is not particularly limited. However, in consideration of production costs of the grain-oriented electrical steel sheet and the capacity of the production equipment, for example, upper limit value of the temperature rising rate is 100° C./second. The definition of the temperature rising rate in the embodiment is required to be satisfied over the entire temperature range of 100 to 800° C. That is, the temperature rising rate of the steel sheet to which the insulation coating treatment solution is applied is required to be 30° C./second or higher constantly in a temperature range of 100 to 800° C.

The baking soaking temperature (° C.) refers to a reaching sheet temperature (maximum sheet temperature) in the baking step and is required to be 800° C. or higher and 1000° C. or lower. The baking soaking temperature is more preferably 850° C. or higher and 950° C. or lower. In a case in which the baking soaking temperature is lower than 800° C., the insulation coating cannot impart sufficient tension to the steel sheet and in a case in which the baking soaking temperature is higher than 1000° C., cracks are initiated in the insulation coating and thus the coating tension may be reduced or insulation properties and the like may be deteriorated. In addition, in a case in which the baking soaking temperature is higher than 1000° C., the steel sheet may be defected.

The soaking retention time (second) refers to the isothermal retention time at the baking soaking temperature. The soaking retention time is required to be 10 seconds or longer and is more desirably 20 seconds or longer. In a case in which the soaking retention time is shorter than 10 seconds, the insulation coating is not sufficiently baked and thus there is a possibility of causing deterioration in moisture absorbency. On the other hand, the soaking retention time is set to 60 seconds or shorter. In a case in which the soaking retention time is longer than 60 seconds, excessive crystallization of the insulation coating occurs and thus the insulation coating becomes porous. Thus, the tension is deteriorated.

The steel sheet which has been subjected to the insulation coating treatment is not particularly limited. The main feature of the grain-oriented electrical steel sheet according to the embodiment is the configuration of the insulation coating, and the effects of the insulation coating of the grain-oriented electrical steel sheet according to the embodiment, that is, the effects that high tension can be imparted to the surface of the steel sheet, the adhesion and the corrosion resistance are good, the productivity is good, and chromate is not incorporated, are exhibited irrespective of the kind of steel sheet.

Preferably, for example, the grain-oriented electrical steel sheet produced using the technique disclosed in Japanese Unexamined Patent Application, First Publication No. H07-268567 is subjected to the above-described insulation coating treatment and thus the effect of reducing an iron loss can be obtained. Specifically, the grain-oriented electrical steel sheet which contains, by unit mass %, at least 0.005% or less of C and 2.5 to 7.0% of Si, may optionally further contain other alloying elements (for example, Mn: 0 to 1.0%, Al: 0 to 0.03%, N: 0.01% or less, P: 0.01% or less, and S: 0.01% or less) in a range of not damaging the properties, and includes a remainder consisting of Fe and impurities, in which the average grain size is 1 to 10 mm and the angle formed between a crystal orientation of (110)[001] and a rolling direction is 8° or less on average, is subjected to the above-described insulation coating treatment and thus the effect of reducing an iron loss can be obtained.

EXAMPLES

Next, examples according to the present invention will be described. However, the following examples are merely examples for describing the present invention and the present invention is not limited to the following examples.

A slab including by mass %, C: 0.082%, Si: 3.25%, Mn: 0.084%, sol.Al: 0.026%, N: 0.0088%, P: 0.008%, and S: 0.023%, and a remainder consisting of Fe and impurities was cast, was heated, and then hot-rolled. Thus, a 2.3 mm hot-rolled sheet was prepared. Next, the steel sheet was annealed at 1100° C. for 5 minutes, then cold-rolled to a thickness of 0.23 mm, and subjected to decarburization annealing at 850° C. Subsequently, an annealing separating agent having MgO as a main component was applied to the cold-rolled sheet after decarburization annealing and final annealing was performed at 1200° C. for 10 hours.

A sample of width 7 cm×length 30 cm was cut out from the coil of the steel sheet after final annealing and the annealing separating agent remaining on the surface was removed by washing with water and light pickling. The glass coating was left and then stress relief annealing was performed. Next, each insulation coating treatment solution having the formulation ratio shown in Table 1 was prepared. In Table 1, the term "silica content (in terms of solid content)" refers to a ratio of the amount of the colloidal silica in terms of solid content in the total amount of the first metal phosphate (phosphate 1), the second metal phosphate (phosphate 2), and the colloidal silica (silica) in terms of solid content. The prepared insulation coating treatment solution was applied to the steel sheet while the amount of the treatment solution was adjusted such that the amount of the coating of the grain-oriented electrical steel sheet after baking was in a range of 4.3 to 4.7 g/m². The steel sheet to which the insulation coating treatment solution was applied was baked under the respective conditions shown in Table 2. In Table 2, the term "temperature rising rate" refers to a temperature rising rate in a temperature range of 100 to 800° C. However, regarding Comparative Examples 4 and 10 in which the temperature was not raised to up to 800° C., the term "temperature rising rate" refers to a temperature rising rate in a temperature range of 100° C. to the soaking temperature. In Table 2, the term "soaking temperature" refers to a baking soaking temperature and the term "soaking time" refers to a soaking retention time.

In the grain-oriented electrical steel sheet after baking, the first metal phosphate content, the second metal phosphate content, the colloidal silica content (in terms of solid content), and the amount of substances other than these components (other substances) were measured. In addition, in the grain-oriented electrical steel sheet after baking, the elution amount of phosphoric acid was measured. The results thereof are shown in Table 3. The elution amount of phosphoric acid was measured by boiling the grain-oriented electrical steel sheet in boiled pure water for 10 minutes, measuring the amount of phosphoric acid eluted into the pure water, and dividing the measured amount of phosphoric acid by the area of the insulation coating of the boiled grain-oriented electrical steel sheet. The measurement of the amount of phosphoric acid eluted into the pure water was calculated by cooling the pure water into which phosphoric acid had been eluted (solution), and measuring the concentration of phosphoric acid of a sample obtained by diluting the solution after cooling with pure water by ICP-AES. The first metal phosphate (phosphate 1) content in the insulation coating was measured by a method of quantitatively measuring the amount of each metal element by ICP-AES, and converting each value obtained in this manner to the amount equivalent to the mass of the metal phosphate according to each metal element. The second metal phosphate (phosphate 2) content was measured by a method of quantitatively measuring the amount of each metal element by ICP-AES, and converting each value obtained in this manner to the amount equivalent to the mass of the metal phosphate according to each metal element. The colloidal silica (silica) content was measured by a method of measuring the amount of Si by ICP-AES and performing conversion. The other substance content was measured by ICP-AES or an atomic absorption spectroscopy.

TABLE 1

| Treatment solution No. | Phosphate 1 (in terms of solid content) | | Phosphate 2 (in terms of solid content) | | Colloidal silica (in terms of solid content) | | | Silica content | Polymerization assistant (in terms of solid content) | | Other substances (in terms of solid content) | |
|---|---|---|---|---|---|---|---|---|---|---|---|---|
| | Metal | Formulated amount [parts by mass] | Metal | Formulated amount [parts by mass] | Grain size [nm] | Formulated amount [parts by mass] | (in terms of solid content) [Mass %] | | Kind | Formulated amount [parts by mass] | Kind | Formulated amount [parts by mass] |
| 1 | Al | 100 | V | 3 | 12 | 100 | 49 | | A | 0.8 | — | 0 |
| 2 | Al | 100 | Zr | 10 | 12 | 60 | 35 | | B | 1.5 | — | 0 |
| 3 | Al/Mn | 50/50 | W | 20 | 8 | 100 | 45 | | C | 0.4 | — | 0 |
| 4 | Al/Zn | 40/60 | V | 5 | 12 | 75 | 42 | | A | 0.8 | — | 0 |
| 5 | Mn | 100 | W | 7 | 12 | 50 | 32 | | D | 5.6 | — | 0 |
| 6 | Al/Fe | 80/20 | Mo | 5 | 12 | 75 | 42 | | A | 0.8 | — | 0 |
| 7 | Ca | 100 | Zr | 7 | 18 | 100 | 48 | | B | 2.5 | — | 0 |
| 8 | Al | 100 | V | 5 | 4.5 | 100 | 49 | | A | 0.4 | — | 0 |
| 9 | Al/Mg | 75/25 | W | 10 | 45 | 100 | 48 | | B | 3.5 | — | 0 |
| 10 | Al | 100 | V | 7 | 12 | 30 | 22 | | C | 0.6 | — | 0 |
| 11 | Al | 100 | V | 10 | 12 | 150 | 58 | | C | 0.6 | — | 0 |
| 12 | Al/Mn | 50/50 | — | 0 | 12 | 100 | 50 | | A | 7 | — | 0 |
| 13 | Al/Mg | 75/25 | — | 0 | 12 | 100 | 50 | | — | 0 | — | 0 |
| 14 | Al/Ni | 50/50 | Zr | 3 | 25 | 75 | 42 | | A | 1.2 | — | 0 |
| 15 | Al | 100 | Co | 7 | 18 | 100 | 48 | | A | 1.2 | — | 0 |
| 16 | Al | 100 | Zr | 10 | 12 | 60 | 35 | | A | 0.2 | — | 0 |

TABLE 1-continued

| Treatment solution No. | Phosphate 1 (in terms of solid content) Metal | Phosphate 1 Formulated amount [parts by mass] | Phosphate 2 (in terms of solid content) Metal | Phosphate 2 Formulated amount [parts by mass] | Colloidal silica (in terms of solid content) Grain size [nm] | Colloidal silica Formulated amount [parts by mass] | Silica content (in terms of solid content) [Mass %] | Polymerization assistant (in terms of solid content) Kind | Polymerization assistant Formulated amount [parts by mass] | Other substances (in terms of solid content) Kind | Other substances Formulated amount [parts by mass] |
|---|---|---|---|---|---|---|---|---|---|---|---|
| 17 | Al/Zn | 100 | — | <u>0</u> | 12 | 75 | 43 | A | 0.8 | — | 0 |
| 18 | Al | 100 | V | 4 | 12 | 75 | 40 | B | 1.5 | J | 10 |
| 19 | Al/Ni | 75/25 | W | 7 | 20 | 75 | 38 | B | 3.5 | K | 15 |

The underlined value is outside the defined range of the present invention.

TABLE 2

| Treatment solution No. | Baking Condition Temperature rising rate [° C./second] | Baking Condition Soaking temperature [° C.] | Baking Condition Soaking time [second] |
|---|---|---|---|
| Example 1 | 1 | 60 | 850 | 35 |
| Example 2 | 2 | 40 | 870 | 25 |
| Example 3 | 3 | 50 | 870 | 45 |
| Example 4 | 4 | 60 | 850 | 15 |
| Example 5 | 5 | 50 | 870 | 15 |
| Example 6 | 6 | 60 | 870 | 45 |
| Comparative Example 1 | <u>7</u> | 50 | 850 | 55 |
| Comparative Example 2 | <u>8</u> | 50 | 870 | 55 |
| Comparative Example 3 | <u>9</u> | 50 | 870 | 35 |
| Comparative Example 4 | <u>10</u> | 50 | <u>750</u> | 25 |
| Comparative Example 5 | <u>11</u> | 35 | 870 | 55 |
| Comparative Example 6 | <u>12</u> | 35 | 870 | 20 |
| Comparative Example 7 | <u>13</u> | 50 | 850 | 35 |
| Comparative Example 8 | 3 | <u>25</u> | 850 | 20 |
| Comparative Example 9 | 4 | 35 | <u>1050</u> | 30 |
| Comparative Example 10 | 4 | 35 | <u>750</u> | 60 |
| Comparative Example 11 | 1 | 50 | 850 | <u>7</u> |
| Comparative Example 12 | 1 | 50 | 850 | <u>65</u> |
| Example 7 | 14 | 50 | 870 | 45 |
| Example 8 | 15 | 50 | 870 | 25 |
| Example 9 | 18 | 40 | 850 | 35 |
| Example 10 | 19 | 40 | 850 | 35 |
| Comparative Example 13 | <u>16</u> | 40 | 870 | 35 |
| Comparative Example 14 | <u>17</u> | 40 | 870 | 45 |

The underlined value is outside the defined range of the present invention.

In Table 1, the symbol "-" indicates that the component is not formulated. In addition, the polymerization assistant "A" indicates nitrous acid, the polymerization assistant "B" indicates phosphonic acid, the polymerization assistant "C" indicates triphosphoric acid, the polymerization assistant "D" indicates sodium nitrite, other substances "J" indicate titanium oxide, and other substances "K" indicate sodium borate. In Table 3, the symbol "-" shown as the amount of "other substances" indicates that the amount of other substances is equal to or less than the detection limit. In some examples, the total value of the first metal phosphate content, the second metal phosphate content, the colloidal silica content, and other substance amount of the insulation coating is not exactly 100 mass %. However, this is because the accuracy in measuring the amount of each substance is different. In Table 3, the insulation coating of the example in which the value of "other substances" is denoted as "-" was substantially formed of only the first metal phosphate content, the second metal phosphate content, and colloidal silica.

TABLE 3

| | Coating composition Phosphate 1 [Mass %] | Coating composition Phosphate 2 [Mass %] | Coating composition Silica [Mass %] | Coating composition Other substances [Mass %] | Elution amount of phosphoric acid [mg/m²] |
|---|---|---|---|---|---|
| Example 1 | 49 | 1.5 | 49 | — | 15 |
| Example 2 | 59 | 5.9 | 35 | — | 12 |
| Example 3 | 45 | 9.1 | 45 | — | 27 |
| Example 4 | 56 | 2.8 | 42 | — | 8 |
| Example 5 | 64 | 4.5 | 32 | — | 22 |
| Example 6 | 56 | 2.8 | 42 | — | 18 |
| Comparative Example 1 | 48 | 3.4 | 48 | — | <u>34</u> |
| Comparative Example 2 | 49 | 2.4 | 49 | — | <u>36</u> |
| Comparative Example 3 | 48 | 4.8 | 48 | — | <u>45</u> |
| Comparative Example 4 | 73 | 5.1 | 22 | — | <u>51</u> |
| Comparative Example 5 | 38 | 3.8 | 58 | — | <u>33</u> |
| Comparative Example 6 | 50 | 0.0 | 50 | — | <u>36</u> |
| Comparative Example 7 | 50 | 0.0 | 50 | — | <u>47</u> |
| Comparative Example 8 | 45 | 9.1 | 45 | — | <u>44</u> |
| Comparative Example 9 | 56 | 2.8 | 42 | — | <u>36</u> |
| Comparative Example 10 | 56 | 2.8 | 42 | — | <u>42</u> |
| Comparative Example 11 | 49 | 1.5 | 49 | — | <u>54</u> |
| Comparative Example 12 | 49 | 1.5 | 49 | — | <u>36</u> |
| Example 7 | 56 | 1.7 | 42 | — | 11 |
| Example 8 | 48 | 3.4 | 48 | — | 16 |
| Example 9 | 53 | 2.1 | 40 | 5 | 23 |
| Example 10 | 51 | 3.6 | 38 | 8 | 24 |
| Comparative Example 13 | 59 | 5.9 | 35 | — | <u>36</u> |
| Comparative Example 14 | 57 | 0.0 | 43 | — | <u>59</u> |

The underlined value is outside the defined range of the present invention.

The coating tension, the adhesion, the corrosion resistance, and the magnetic properties of the grain-oriented electrical steel sheet in which the insulation coating was formed as described above were evaluated. The evaluation results are shown in Table 4.

The coating tension of the insulation coating was measured by the warpage amount of the steel sheet at the time of peeling off the insulation coating on one surface. The sample having a coating tension of 1.5 N/mm² or more was determined to be a pass on the coating tension.

condition was evaluated in 10 stages. The sample without rusting was evaluated as corrosion resistance 10 and the sample having a 50% area ratio rusted area was evaluated as corrosion resistance 1. The sample with corrosion resistance 7 or higher was evaluated as a pass on the corrosion resistance.

TABLE 4

|  | Coating tension [N/mm²] | Magnetic properties | | Adhesion [peeling diameter (mm)] | External appearance of insulation coating [SEM observation] | Corrosion resistance |
|  |  | $B_8$ [T] | $W_{17/50}$ [W/kg] |  |  |  |
| --- | --- | --- | --- | --- | --- | --- |
| Example 1 | 2.3 | 1.94 | 0.77 | 0 | Good with smooth surface | 10 |
| Example 2 | 2.1 | 1.92 | 0.76 | 0 | Slightly cracked but smooth | 8 |
| Example 3 | 2.4 | 1.94 | 0.78 | 0 | Almost no cracks | 10 |
| Example 4 | 2.6 | 1.92 | 0.81 | 0 | Good | 9 |
| Example 5 | 1.9 | 1.93 | 0.82 | 0 | Very smooth | 9 |
| Example 6 | 2.2 | 1.93 | 0.79 | 0 | Slightly blackish but smooth | 9 |
| Comparative Example 1 | 1.6 | 1.93 | 0.88 | 30 | Numerous remarkable crack initiated | 4 |
| Comparative Example 2 | 1.4 | 1.93 | 0.85 | 10 |  | 4 |
| Comparative Example 3 | 1.1 | 1.92 | 0.87 | 20 | Fractures initiated | 3 |
| Comparative Example 4 | 1.5 | 1.93 | 0.91 | 30 |  | 3 |
| Comparative Example 5 | 1.3 | 1.93 | 0.84 | 0 | Numerous swellings occurred | 6 |
| Comparative Example 6 | 1.5 | 1.92 | 1.05 | 0 | Swelling occurred | 7 |
| Comparative Example 7 | 1.4 | 1.87 | 1.11 | 30 | Numerous voids and defects generated | 2 |
| Comparative Example 8 | 1.2 | 1.91 | 0.83 | 10 |  | 5 |
| Comparative Example 9 | 1.3 | 1.92 | 0.93 | 10 | Fractures initiated | 3 |
| Comparative Example 10 | 1.1 | 1.92 | 0.91 | 10 |  | 6 |
| Comparative Example 11 | 1.3 | 1.91 | 0.92 | 10 |  | 6 |
| Comparative Example 12 | 1.4 | 1.92 | 0.87 | 10 |  | 4 |
| Example 7 | 2.1 | 1.93 | 0.81 | 0 | Good | 9 |
| Example 8 | 2.0 | 1.92 | 0.81 | 0 | Very slightly uneven in color but smooth | 8 |
| Example 9 | 1.9 | 1.92 | 0.82 | 0 | Slightly whitish but smooth | 8 |
| Example 10 | 2.0 | 1.91 | 0.82 | 0 | Slightly whitish but no problem | 7 |
| Comparative Example 13 | 1.5 | 1.91 | 0.91 | 20 | Cloudy and lusterless | 6 |
| Comparative Example 14 | 1.6 | 1.91 | 0.89 | 10 |  | 4 |

In addition, regarding the adhesion, the diameter at which the insulation coating was peeled off at the time of winding each steel sheet around each round rod having diameters of 10 mm, 20 mm, and 30 mm respectively after a cellophane tape was attached to each steel sheet was evaluated. In Table 3, "0" indicates a case in which the insulation coating is not peeled off even at a diameter of 10 mm of the round rod around which the steel sheet is wound. The sample in which the insulation coating was not peeled off at the time of winding the steel sheet around the round rod having a diameter of 20 mm or 30 mm was determined to be a pass on the adhesion.

Various magnetic properties were measured by a single sheet magnetic property test (Single Sheet Tester: SST test) defined according to JIS C2556. The sample having a $B_8$ of 1.91 or more and a $W_{17/50}$ of 0.83 or less was determined to be a pass on the magnetic properties.

The corrosion resistance was evaluated in a 5% salt water spray test. The spraying time was set to 10 hours. The rusting With reference to the results of Table 4, it was found that the insulation coating formed by using the combination of the metal phosphates defined in the present invention and the polymerization assistant and having the elution amount of phosphoric acid controlled to be 30 mg/m² or less had high tension and excellent adhesion compared to Comparative Examples. In addition, it was found that the grain-oriented electrical steel sheet in which such an insulation coating was formed had improved magnetic properties. On the other hand, Comparative Examples outside the defined range of the present invention did not have excellent properties.

Specifically, since the first metal phosphate was a Ca salt in Comparative Example 1, cracks were initiated in the insulation coating and thus the adhesion was deteriorated. In Comparative Example 2, since colloidal silica having a grain size smaller than the grain size in the range of the present invention was used as the material, the insulation coating became a porous coating having large voids and thus the adhesion was reduced. In Comparative Example 3, since colloidal silica having a grain size larger than the grain size in the range of the present invention was used as the material, fractures were initiated in insulation coating and thus the adhesion was reduced.

In addition, in Comparative Example 4, since the formulation ratio of the colloidal silica was smaller than the formulation ratio in the range of the present invention, crystallization of the insulation coating proceeded and thus the adhesion was reduced. In Comparative Example 5, since the formulation ratio of the colloidal silica was larger than the formulation ratio in the range of the present invention, swelling occurred in the insulation coating. In Comparative Example 6, since the insulation coating treatment solution of a combination of metal phosphates different from the combination of the metal phosphates of the present invention was used as the material, swelling occurred and the coating tension was deteriorated. In Comparative Example 7, since the insulation coating treatment solution of a combination of metal phosphates different from the combination of the metal phosphates of the present invention was used as the material and the polymerization assistant was not used, the insulation coating became a porous coating having large voids and thus the adhesion was deteriorated. In Comparative Examples 8 to 12, since any of the temperature rising rate, soaking temperature, and soaking time was outside the defined range of the present invention, crystallization of the insulation coating proceeded, the insulation coating became a porous coating, and thus the adhesion was deteriorated. In Comparative Example 13, since the polymerization assistant was not sufficient, the insulation coating became a porous coating having large voids, and thus the adhesion was deteriorated. In Comparative Example 14, since the insulation coating treatment solution of a combination of metal phosphates different from the combination of the metal phosphates of the present invention was used as the material, the coating tension was deteriorated.

Thus, according to the present invention, by improving the properties of the insulation coating not containing a chromium compound formed on the surface of the grain-oriented electrical steel sheet, the coating tension and the adhesion of the insulation coating can be improved and thus magnetic properties of the grain-oriented electrical steel sheet can be improved.

In addition, the grain-oriented electrical steel sheet according to the present invention can be suitably used as an iron core material in the production of a transformer.

In the above description, the suitable embodiments of the present invention have been described above while referring to the accompanying drawings. However, the present invention is not limited to these examples. It will be apparent that those having general knowledge in the field to which the present invention belongs may find various alternations and modifications within the scope of the technical ideas described in the appended claims, and it should be understood that these alternations and modifications will naturally belong to the technical scope of the present invention.

INDUSTRIAL APPLICABILITY

According to the present invention, since the thermal expansion coefficient is small, the adhesion is high, and the density is high, the insulation coating capable of imparting high tension to the surface of the steel sheet and not containing chromate is provided. According to the present invention, it is possible to obtain a grain-oriented electrical steel sheet having significantly improved magnetic properties without using chromate. In addition, according to the present invention, it is possible to obtain a grain-oriented electrical steel sheet having good corrosion resistance, slidability, and productivity.

The invention claimed is:

1. A grain-oriented electrical steel sheet comprising:
    a steel sheet; and
    an insulation coating,
    wherein the insulation coating contains
    a first metal phosphate which is a metal phosphate of one or more metals selected from Al, Fe, Mg, Mn, Ni, and Zn,
    a second metal phosphate which is a metal phosphate of one or more metals selected from Co, Mo, V, W, and Zr, and
    colloidal silica,
    the insulation coating does not contain chromate, and
    an elution amount of phosphoric acid of the insulation coating as determined by boiling the grain-oriented electrical steel sheet in a boiled pure water for 10 minutes, then measuring an amount of phosphoric acid eluted into the pure water, and dividing the amount of phosphoric acid by the area of the insulation coating of the boiled grain-oriented electrical steel sheet is 30 mg/m$^2$ or less.

2. The grain-oriented electrical steel sheet according to claim 1,
    wherein the first metal phosphate is the metal phosphate of the one or more metals selected from Al, Mg, Ni, and Zn.

3. The grain-oriented electrical steel sheet according to claim 1,
    wherein the second metal phosphate is the metal phosphate of the one or more metals selected from V, W, and Zr.

4. The grain-oriented electrical steel sheet according to claim 1,
    wherein a second metal phosphate content is 0.5 to 10.0 mass % with respect to a total mass of the insulation coating.

5. The grain-oriented electrical steel sheet according to claim 1,
    wherein a colloidal silica content is 25 to 55 mass % in terms of solid content with respect to the total mass of the insulation coating.

6. The grain-oriented electrical steel sheet according to claim 1,
    wherein an average primary grain size of the colloidal silica is 7 to 30 nm.

7. The grain-oriented electrical steel sheet according to claim 1,
    wherein a coating amount of the insulation coating is 2.0 to 7.0 g/m$^2$.

8. The grain-oriented electrical steel sheet according to claim 1,
    wherein the insulation coating includes at least one selected from the group consisting of boric acid, sodium borate, titanium oxide, molybdenum oxide, a pigment, and barium titanate.

9. The grain-oriented electrical steel sheet according to claim 1,
    wherein the steel sheet includes, by unit mass %,
    C: 0.005% or less,
    Si: 2.5 to 7.0%,
    Mn: 0 to 1.0%,
    Al: 0 to 0.03%,
    N: 0.01% or less,
    P: 0.01% or less, S: 0.01% or less, and
a remainder consisting of Fe and impurities,
an average grain size of the steel sheet is 1 to 10 mm, and
an angle formed between a crystal orientation of (110) [001] and a rolling direction of the steel sheet is 8° or less on average.

* * * * *